Figure 1:
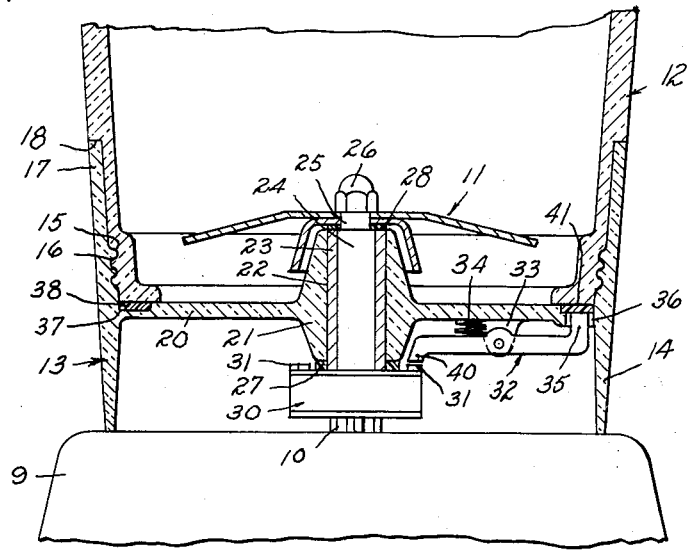

April 14, 1964        J. C. KUZARA        3,128,996

MIXER DRIVE LOCK

Filed Dec. 1, 1960

*INVENTOR.*
JOHN C. KUZARA

BY

*Lindsey, Prutzman & Hayes*
ATTORNEYS 3,128,996
MIXER DRIVE LOCK
John C. Kuzara, New Britain, Conn., assignor to Landers, Frary & Clark, New Britain, Conn., a corporation of Connecticut
Filed Dec. 1, 1960, Ser. No. 73,033
8 Claims. (Cl. 259—108)

This invention relates generally to mixing and blending devices of the type having a motor driven cutter or impeller located in the bottom of a container that is separable from the motor drive and has for a primary object the provision of an improved mixing device of the type described that is exceptionally easy to clean while being safe to operate.

It is a further object of the invention to provide an improved mixing device whose container is separable into easily cleaned parts which must be properly assembled before the device can be operated.

An additional object of this invention is the provision of an improved mixing device of the type described having an automatically operable interlock that precludes rotor or agitator rotation prior to proper assembly of the component parts of the container.

A more specific object is the provision in a mixing device of a self-contained, inexpensive and reliable mechanical interlock to prevent unsafe operation of the device.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 2:
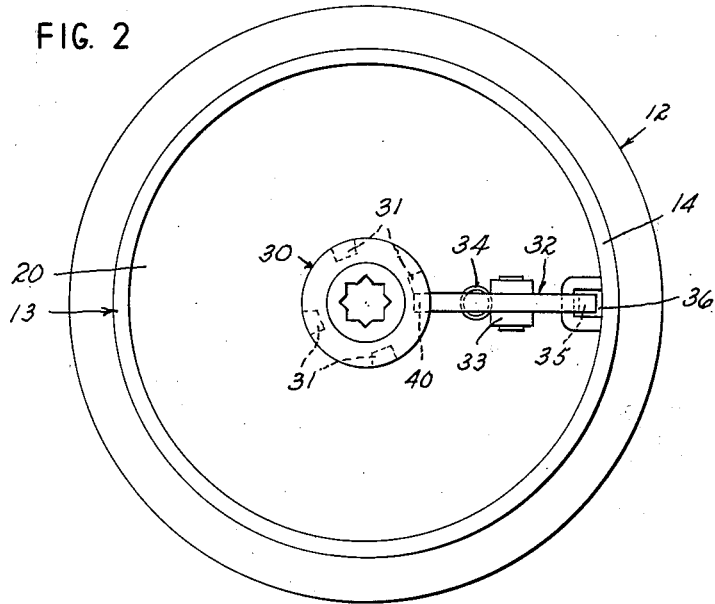

In the drawings:

FIG. 1 is a fragmentary elevational view of a preferred embodiment of the mixer of this invention showing portions thereof in cross section; and FIG. 2 is a bottom plan view of the container of FIG. 1.

Referring to the drawings there is shown in FIG. 1 a mixer having a base or housing 9 for a suitable drive motor whose shaft 10 is splined and extends upwardly therefrom for driving connection to the agitator assembly 11 mounted in a container.

A preferred container comprises an upper vessel portion 12 (only partially shown) and a lower vessel portion 13 having a depending skirt 14 resting adjacent the upper portion of the motor housing 9. The upper and lower vessel portions 12 and 13 have cooperating threads 15 and 16, respectively, for securing the upper and lower portions into a usable container assembly. The lower portion 13 has an upstanding flange 17 that engages a shoulder 18 on the upper vessel portion 12 to provide a stop to prevent excessive tightening of the vessel portions and to increase the rigidity and strength of the vessel assembly. The cooperating threads 15 and 16 may be of the Mason jar type if desired, however, other types of securing means between the upper and lower vessel portions may be used, i.e. a bayonet-type fitting.

The lower container portion 13 has a bottom wall 20 having a central stanchion 21 through which a vertical aperture 22 extends. A bushing 23 and a shaft 24 are mounted in aperture 22 so that the threaded end 25 of shaft 24 extends into the vessel. The agitator assembly 11 is fastened to shaft end 25 by the nut 26, and washers 27 and 28 provide thrust bearing surfaces for the assembly. A coupling 30 is secured to the lower portion of the shaft 24 and is centrally apertured and splined to receive the motor shaft 10.

As a part of the locking feature of the preferred embodiment of this invention there is provided upon the outer perimeter of the upper radial surface of the coupling 30 a plurality of upstanding abutments 31. Mounted to engage these abutments is a lever 32 pivotally supported on a lug 33 that is secured to, or made integral with, the bottom wall 20. A coil spring 34 retained between the bottom part 20 and the lever, biases the left leg of the lever 32 downwardly. The right leg of the lever 32 has an upstanding abutment 35 that is freely reciprocal within a slot 36 located adjacent the outer edge of the bottom wall 20. The bottom wall 20 has an annular groove 37 in which a gasket or sealing ring 38 is freely reciprocable. The annular groove 37 is located immediately above the slot 36 and consequently, the ring 38 is engaged by the abutment 35 on the lever 32. The lower end 41 of the upper vessel portion 12 engages the upper surface of the seal 38, and when the upper and lower vessel portions are properly assembled, the end 41 will secure the seal 38 tightly within the groove 37 to provide a leakproof engagement. Additionally, the end 41 extends slightly inwardly of the seal 38 to prevent contact between the seal and the fluids or particles in the container. When the upper portion 12 is disassembled from the lower portion 13, the seal 38 will move upwardly due to the force of the abutment 35 brought about by the pressure of the spring 34. An abutment 40 on the left leg of the lever 32 will then move downwardly toward coupling 30.

In order to clean the container after use, the container is removed from the base and the upper portion is disassembled from the bottom portion to provide easy access to the agitator and to the upper portion. Immediately upon removal of the upper vessel portion 12, the lever 32 will force the abutment 40 downwardly so that reassembly of the bottom portion on the base 9 would bring about an interlock between the abutment 40 and one of the abutments 31 and prevent rotation of the agitator. In the event that the locking lever abutment 40 engages the upper surface of one of the abutments 31, a partial rotation of the agitator would then be permitted before the interlock is effected.

Upon reassembly of the upper vessel portion 12, the lower end 41 will engage the seal and force the lever 32 in a clockwise direction thereby moving the abutment 40 out of the interlock position. Therefore, the locking mechanism assures that the upper portion is securely fastened to the lower portion before the agitator may be actuated and prevents inadvertent operation of the agitator prior to the complete assembly of the mixer container. It will be noted that the interlock will not be actuated to the non-lock position until the upper and lower container portions are secured effectively together and the seal is properly depressed into its recess.

As will be apparent to persons skilled in the art, various modifications and adaptations of the structure above described will become readily apparent without departure from the spirit and scope of the invention, the scope of which is defined in the appended claims.

I claim:

1. A mixer comprising, a vessel having first and second portions, said portions having cooperating means thereon releasably securing the portions into a unitary assembly, a driven agitator rotatably mounted on said first portion, locking means preventing rotation of said agitator when said first and second portions are disconnected, and means actuated to release said locking means upon assembly of said first and second portions.

2. A mixer comprising, a vessel separable into a bottom portion and a side portion, an agitator rotatably mounted in the bottom portion, a motor driving said agitator through a separable mechanical connection, a pivotally mounted lever biased into locking engagement with said mechanical connection to prevent the driving of said agitator when the side portion is separated from the bottom portion, and means moving the lever out of said locking engagement upon assembly of the bottom and side portions, whereby the agitator cannot be driven by the motor until the mixer vessel is completely assembled.

3. A mixer comprising, a container having separable bottom and side portions, said bottom portion threadingly cooperating with the lower end of the side portion, an agitator rotatably mounted in the bottom portion, mechanical means including a rotating member driving said agitator, said member having an abutment thereon, a seal disposed between said bottom and said side portions when assembled, a lever pivotally mounted so that one end is engageable with said abutment and the opposite end is engageable with said seal at a position opposite said side portion, the said one end of said lever being held out of engagement with the abutment when the bottom and side portions are in complete thread engagement, and means biasing the lever into engagement with said abutment upon separation of said bottom and side portions.

4. A mixer comprising, a container having separable side and bottom portions, a lever pivotally mounted on the underside of said bottom portion, an agitator rotatably mounted on the bottom portion, drive means for said agitator, means associated with one end of said lever when the side and bottom portions are separated for locking said drive means against rotation with respect to said bottom portion, and maens actuating said lever out of locking engagement upon assembly of said side and bottom portions.

5. A mixer defined by claim 4 wherein the actuating means comprises an abutment on said lever actuated by the side portion.

6. A mixer defined by claim 4 further comprising a seal disposed between the bottom and side portions and wherein the actuating means comprises an abutment on said lever engaged by said seal when said bottom portion and said side portion are assembled.

7. A mixer comprising, a container having separable upper and lower portions provided with cooperating seating surfaces, said portions having engaging cooperating means completing and securing the assembly of the upper and lower portions, an agitator in said container fixed to a shaft extending through and rotatably mounted on the lower portion, locking means supported on the underside of the lower portion preventing rotation of the shaft relative to said bottom portion when it is disconnected from said side portion, and means releasing the locking means upon proper engagement of the cooperating means in the assembly of the upper and lower portions.

8. The mixer defined by claim 7 further comprising a seal clamped between said seating surfaces when upper and lower portions are assembled for preventing passage of fluid between said surfaces, and said releasing means including an abutment engaging the seal.

References Cited in the file of this patent
UNITED STATES PATENTS

| | | |
|---|---|---|
| 2,028,595 | Flegel | Jan. 21, 1936 |
| 2,804,289 | Schwaneke | Aug. 27, 1957 |